E. McCOY.
TREAD FOR TIRES.
APPLICATION FILED DEC. 31, 1910.
1,127,789.
Patented Feb. 9, 1915.
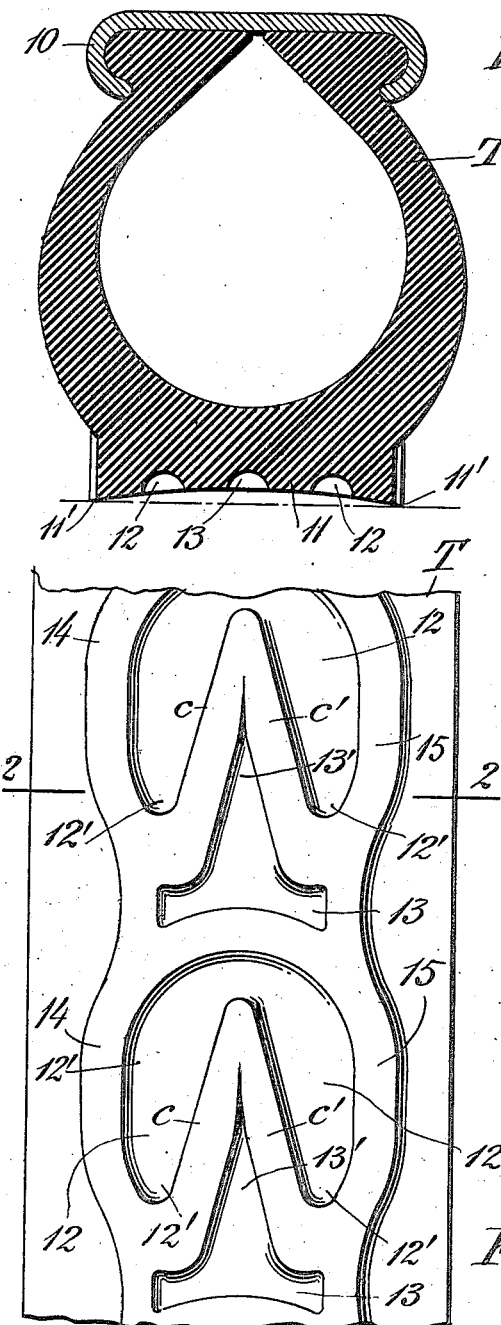
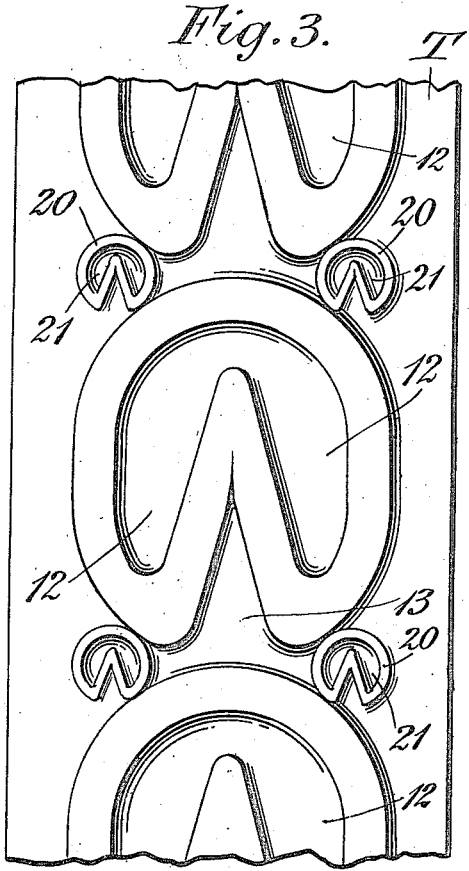
Fig. 2.
Fig. 3.
Fig. 1.
Witnesses
F. E. Ernst
Anna E. Raviler
Inventor
Elijah McCoy,
By
Attorneys

UNITED STATES PATENT OFFICE.

ELIJAH McCOY, OF DETROIT, MICHIGAN, ASSIGNOR OF FIFTY-TWO ONE-HUNDREDTHS TO JOHN N. COURTNEY AND CHARLES H. H. WHEELER, OF DETROIT, MICHIGAN, AND FORTY-EIGHT ONE-HUNDREDTHS TO JOHN N. COURTNEY, OF DETROIT, MICHIGAN.

TREAD FOR TIRES.

1,127,789.  Specification of Letters Patent.  Patented Feb. 9, 1915.

Application filed December 31, 1910. Serial No. 600,210.

*To all whom it may concern:*

Be it known that I, ELIJAH McCOY, a citizen of the United States of America, residing at Detroit, in the county of Wayne and State of Michigan, have invented certain new and useful Improvements in Treads for Tires, of which the following is a specification, reference being had therein to the accompanying drawings.

This invention relates to vehicle tires, and more especially to pneumatic or cushion tires, the wearing surface of which is made of rubber or similar elastic material, and it has for one of its objects the provision of a tire of this kind in which the tread-portion has a series of individual and separated recesses to constitute suction-chambers from which the air is excluded to a greater or lesser extent by the load carried on the tire, so that, as the tire revolves, and the recesses tend to assume their normal shape and depth, a partial vacuum will be established in these recesses or pockets, which circumstance naturally tends to increase the traction of adhesion of the tire-tread on the ground.

The invention has, furthermore, for its object the provision of a resilient tire having what may be termed a "concave" tread the wearing edges will be laterally expanded under load and cause the parallel outer edges to hug the ground with more frictional force than the central portion of the tread.

Further objects of the invention will hereinafter appear, and particularly defined in the claims.

The invention has been clearly illustrated in the accompanying drawings, in which similar characters denote similar parts, and in which—

Figure 1 is a face view of a tire-tread embodying my invention; Fig. 2 is a cross-section thereof on line 2—2 of Fig. 1; and Fig. 3 represents a face view similar to Fig. 1 but illustrating modification.

Referring to the drawings, the wheel rim 10 (see Fig. 2) has in-turned flanges to grip and hold the rubber-tire T which is herein shown as a "casing" for an inner tube (not shown). The tread 11 of the tire is slightly concaved thus causing the side edges 11' to rest on the ground; while when a load is put on the tire, the central portion will also be brought into contact with the ground at the same time displacing the side edges 11' laterally. In fact, the tire-tread approaches a "bridge" construction which flattens itself under load, and tends to resume its normal condition when the load is removed, such tendency being resisted by a certain amount of suction caused by the tire-tread flattening itself on the ground and also by the expansion of the space between the side-edges thereof. For this reason, a tire shaped in this manner possesses great adhesive properties and therefore reduces the liability of "skidding" very materially.

In order to increase the value of the tire, as far as its non-skidding qualities are concerned, I have provided in the tread-portion thereof a series of separate "pockets" or depressions, in such a way that the raised portions or "walls" thereof will however present a continuous and unbroken chain of tread to avoid "bumping." In other words, as the wheel runs on the ground, it is supported by the walls of one pocket before the walls of the preceding pocket are out of engagement. The pockets are indicated in Figs. 1 and 2, by the numerals 12, 13, the side walls 14, 15 forming a practically straight but, at any rate, a continuous resting surface for the wheel. Inasmuch as the bronco is considered one of the most sure-footed of animals, and nature has doubtless endowed this animal with its peculiarly-shaped hoof for its particular purpose, I have endeavored to shape the tire-pockets in conformity with the "bronco-hoof," at the same time arranging these pockets in such a manner that their surrounding walls overlap each other, and that they are of substantially equal thickness all around. In this manner the smaller pockets 13 are formed so that the consecutive pockets may overlap each other as well, as indicated at 12' and 13' respectively. It will be noticed that the pocket walls are converging as for instance indicated at c, c' (see Fig. 1), by virtue of which construction the traction wheel is increased, and tendency to "spin" is proportionately reduced, because a drag of the tire over the ground, will tend to concentrate the particles of the road-surface top, in the portion 12' when going in one direction, and in the portions 13' when dragging in the other direction.

Of course, the arrangement and shape of the several pockets can be varied according to the fancy of the designer without departing from the spirit of the invention, the salient features of which can be summarized as follows:—separate pockets disposed in series and overlapping each other, and having their inclosing walls also overlapping to present a continuous "running" surface for the wheel; and furthermore the converging walls of the pockets whereby the traction of the tire is increased to reduce the liability of wheel-spinning.

I claim:

1. The combination with a tire, of a thickened tread portion forming part thereof and composed of large curved and straight integral ridges grouped upon said tire and providing large individual inclosed pockets partially divided by reëntrant straight ridges, and small curved and straight integral ridges grouped upon said tire and coöperating with the large curved and straight ridges in forming substantially T-shaped pockets that alternate with the first mentioned pockets, said large and small ridges varying in depth and coöperating in providing a continuous running surface for the thickened tread portion that is concave in cross section whereby the pockets of said tread portion tend to flatten out and become vacuous when brought by pressure into contact with the surface.

2. The combination with a tire, of a thickened tread portion forming part thereof and composed of large curved and straight integral ridges upon said tire and providing large individual inclosed pockets partially divided by reëntrant straight ridges, and curved ridges upon said tire and integral with the large curved ridges and coöperating with the large curved and straight ridges in forming substantially T-shaped pockets that alternate with the first mentioned pockets, said ridges varying in depth and coöperating in providing a continuous running surface for the thickened tread portion that is concave in cross section whereby the pockets of said tread portion tend to flatten out and become vacuous when brought by pressure into contact with the surface.

In testimony whereof I affix my signature in presence of two witnesses.

ELIJAH McCOY.

Witnesses:
 C. R. STICKNEY,
 OTTO F. BARTHEL.